US008660012B2

(12) United States Patent
Pape et al.

(10) Patent No.: US 8,660,012 B2
(45) Date of Patent: Feb. 25, 2014

(54) METHOD, ELECTRONIC COMPONENT AND SYSTEM FOR THE DIAGNOSIS OF COMMUNICATION CONNECTIONS

(75) Inventors: Andreas Pape, Brakel (DE); Thorsten Behr, Detmold (DE); Friedrich Wegener, Vahlbruch (DE)

(73) Assignee: Phoenix Contact GmbH & Co. KG (DE)

( * ) Notice: Subject to any disclaimer, the term of this patent is extended or adjusted under 35 U.S.C. 154(b) by 457 days.

(21) Appl. No.: 12/977,772

(22) Filed: Dec. 23, 2010

(65) Prior Publication Data
US 2011/0170434 A1    Jul. 14, 2011

(30) Foreign Application Priority Data
Jan. 14, 2010   (DE) ................. 10 2010 004 745

(51) Int. Cl.
*G01R 31/08* (2006.01)
(52) U.S. Cl.
USPC ............ 370/241; 370/216; 370/242; 370/252
(58) Field of Classification Search
USPC ......... 370/216, 229, 232, 236, 241, 242, 252, 370/276, 310
See application file for complete search history.

(56) References Cited

U.S. PATENT DOCUMENTS

| | | | |
|---|---|---|---|
| 6,298,454 B1 | 10/2001 | Schleiss et al. | |
| 7,233,568 B2 * | 6/2007 | Goodman et al. | 370/218 |
| 2002/0116150 A1 * | 8/2002 | Franke et al. | 702/185 |
| 2004/0120706 A1 | 6/2004 | Johnson et al. | |
| 2005/0229040 A1 * | 10/2005 | Franke et al. | 714/25 |
| 2006/0198318 A1 * | 9/2006 | Schondelmayer et al. | 370/252 |
| 2006/0221843 A1 * | 10/2006 | Cidon et al. | 370/248 |
| 2007/0086351 A1 * | 4/2007 | Noble et al. | 370/244 |
| 2007/0230407 A1 * | 10/2007 | Petrie et al. | 370/337 |

(Continued)

FOREIGN PATENT DOCUMENTS

| | | |
|---|---|---|
| DE | 197 52 792 A1 | 6/1999 |
| DE | 101 19 151 A1 | 12/2002 |

(Continued)

OTHER PUBLICATIONS

"European Search Report for International Application No. 11000190.6-2206", Dated: May 12, 2011, Publisher: European Patent Office, Published in: EP.

(Continued)

*Primary Examiner* — Kwang B Yao
*Assistant Examiner* — Nguyen Ngo
(74) *Attorney, Agent, or Firm* — Kaplan, Breyer, Schwarz & Ottesen, LLP

(57) ABSTRACT

The invention relates to a method and system for diagnosing communication connections in a communication system. The invention enables the provision of a plurality of first diagnosis units and at least one second diagnosis unit, wherein the first and second diagnosis units each are assigned to a communication connection of the communication system and are configured for determining a value of a diagnosis variable of the respectively assigned communication connections, and provides for determining a value of at least one diagnosis variable by each of the first diagnosis units, determining a value of at least one diagnosis variable by the at least one second diagnosis unit, transferring the values determined by the first diagnosis units to an evaluation unit, statistically evaluating the transferred values by the evaluation unit, and diagnosing the values determined by the at least one second diagnosis unit depending on the statistical evaluation by the evaluation unit.

15 Claims, 1 Drawing Sheet

(56) References Cited

U.S. PATENT DOCUMENTS

| | | | |
|---|---|---|---|
| 2007/0242688 A1* | 10/2007 | McFarland | 370/445 |
| 2008/0075103 A1* | 3/2008 | Noble et al. | 370/429 |
| 2009/0034421 A1* | 2/2009 | Kodama et al. | 370/242 |
| 2009/0175199 A1* | 7/2009 | Trojer | 370/254 |
| 2010/0034098 A1* | 2/2010 | Wang et al. | 370/242 |
| 2010/0302954 A1* | 12/2010 | Tirpak et al. | 370/252 |
| 2012/0026908 A1* | 2/2012 | Tzannes et al. | 370/252 |

FOREIGN PATENT DOCUMENTS

| | | |
|---|---|---|
| EP | 0 573 357 A1 | 12/1993 |
| EP | 0 599 606 A2 | 6/1994 |
| EP | 1 251 416 A1 | 10/2002 |
| EP | 1 703 650 A1 | 9/2006 |
| WO | 2004/030275 A1 | 4/2004 |
| WO | 2007130877 A2 | 11/2007 |

OTHER PUBLICATIONS

"German Office Action for International Application No. 10 2010 004 745.7-31 dated Oct. 12, 2010", Publisher: German Patent Office, Published in: DE.

"Related Chinese Patent Application No. CN201110027357.5 Office Action", Jan. 29, 2013, Publisher: SIPOPRC, Published in: CN.

\* cited by examiner

METHOD, ELECTRONIC COMPONENT AND SYSTEM FOR THE DIAGNOSIS OF COMMUNICATION CONNECTIONS

CROSS-REFERENCE TO RELATED APPLICATIONS

German patent application DE 10 2010 004 745.7-31, filed Jan. 14, 2010, is incorporated herein by reference.

FIELD OF THE INVENTION

The invention relates in general to data transmission and in particular to a method, an electronic component and a system for the diagnosis of communication connections.

BACKGROUND OF THE INVENTION

Systems for the diagnosis of communication connections are known such as, for example, systems known from the Ethernet field which analyze copper wires or optical fiber connections, hereinafter also designated as FO (fiber optic) connections, for packet lengths, number of incorrect data packets or other variables and make the data available via a suitable diagnosis interface such as, for example, an integrated web server or SNMP (Simple Network Management Protocol). Such systems are also used, for example, for the diagnosis of Bluetooth radio connections, wherein typically not only errors are evaluated, but also information about receiving and transmitting power of the communication signals is possible.

From DE 101 19 151 A1, for example, a diagnosis device for a field bus with control-independent information transfer is known, wherein the transfer of diagnosis data takes place via the PLC I/O bus and the interfaces present in the PLC (Programmable Logic Controller).

All such systems are limited—as in the case of the Ethernet diagnosis—to purely counting the errors or, as in the case of the Interbus FO diagnosis and the Bluetooth radio diagnosis, allow to draw anticipatory conclusions about errors still to come or causes of errors already occurred.

All systems have in common that with respect to the limit values for the diagnosis data necessary for an error-free operation of the communication connection, they are exclusively based on real "worst case" limit values which define the extent of the deviation of a variable from the normal state at which deviation the function of the system is not yet at risk. Within the worst case limit values for certain measured variables or from variables derived from said measured variables, thus, typically, an error-free function of the respective system is ensured.

Certain errors such as, for example, poor connector assembly or poor cable laying can be such that they are not detected through an analysis based on worst case limit values because the errors initially cause only a minor disturbance of the transmission quality.

SUMMARY OF THE INVENTION

The invention is thus based on the object to show a way how the diagnosis of communication connections can be improved. It is in particular the object of the invention to show how errors in a communication system can be detected which typically are not detected in case of an analysis based on worst case limit values.

The inventors have recognized that many potential errors in a communication system can "hide" within the worst case limits of the system. Such cases can occur because typical components such as, for example, FO transmitters, FO receivers or FO cables are usually significantly better than the specified limit values so that an error in case of a component such as, for example, a poor connector assembly at a FO cable can be "hidden" by particularly good transmitters and receivers. This usually does not result directly in a problem because the path is operated in a secure range; however, the error cannot be found with a worst case observation and can result in a failure of the path or communication connection at a later time.

In order to detect these potential errors, the invention provides to apply a statistical mathematical method to the diagnosis data to preferably determine new limit values which are better adapted to the reality.

Accordingly, a method according to the invention for the diagnosis of communication connections in a communication system comprises providing a plurality of first diagnosis units and at least one second diagnosis unit, wherein the first and second diagnosis units each are assigned to at least one communication connection of the communication system and are configured for determining a value of at least one diagnosis variable of the respectively assigned communication connections, determining a value of at least one diagnosis variable by each of the first diagnosis units, determining a value of at least one diagnosis variable by the at least one second diagnosis unit, transferring the values determined by the first diagnosis units to an evaluation unit, statistically evaluating the transferred values by the evaluation unit, and a diagnosis of the values determined by the at least one second diagnosis unit depending on the statistical evaluation by the evaluation unit.

Depending on the purpose of use, the communication connections of the communication system can be wireless or wired and can comprise, for example, an optical fiber or a copper cable. The communication within the communication system can be based, for example, on one of the standards Ethernet, Interbus or Bluetooth. However, any other suitable communication standard can also be used.

The statistical evaluation is carried out in an advantageous manner by the standard diagnosis software of diagnosis units available for the type of the respective communication system.

Particularly preferred comprises the statistical evaluating by the evaluation unit determining an upper and/or lower limit value for at least one diagnosis variable, and the diagnosis comprises comparing the values determined by the at least one second diagnosis unit with the upper and/or lower limit value.

Advantageously, as upper or lower limit value for the at least one diagnosis variable, a value is determined below or above which, respectively, a predetermined proportion of the values of the respective diagnosis variable determined by the first diagnosis units lies. Depending on the type of error and observed diagnosis variable, the predetermined proportion lies preferably below 100%, in particular below 95%, in particular below 90%, in particular below 85%, in particular below 80%.

Accordingly, the statistical evaluation advantageously provides a value as limit value which is met by a predetermined proportion, for example 80%, of all installed communication connections. Values which lie beyond such a limit value are typically still within the system specification defined by worst case limit values; however, with a very high probability, erroneous communication connections are involved.

Preferably, the statistical evaluating by the evaluation unit can also comprise determining an average value of at least one diagnosis variable.

In order to perform such an evaluation, the device which comprises the evaluation unit collects all determined diagnosis data of all available communication connections of the communication system in a data base. Particularly advantageous, new communication connections are continuously included as well in the evaluation.

Accordingly, the method preferably provides to repeatedly perform determining and transferring the diagnosis data as well as statistically evaluating and diagnosing in predetermined time intervals and/or during a change of the configuration of the communication system.

In this manner, the limit values and/or average values determined by statistically evaluating change in an advantageous manner over time and thus provide an image of the real conditions in the communication system - much better than this is the case with worst case limit values. In case of duplex communication connections which are typically used, for example, with Ethernet, Interbus or also wireless connections, particularly preferred, the diagnosis data of both communication directions of the same communication connection, thus, for example, the delivery and return conductor of the same FO cable, are compared to each other. A major deviation of the diagnosis values of the two directions are indicates errors in an advantageous manner because differences in the same transmission path are unlikely due to identical environmental conditions and minor scatterings of communication parameters, for example, within a cable.

Accordingly, the method advantageously provides, for at least one duplex communication connection with a first and a second data direction, to determine a first value for the first data direction and a second value for the second data direction of at least one diagnosis variable, wherein the diagnosis comprises comparing the first and second value to each other and/or to an upper and/or lower limit value and/or average value determined by the statistical evaluation.

Possible diagnosis variables for different transmission systems comprise the transmitting power and the receiving power, for example, of a FO or radio connection, the path length of the respective communication connection, a bit error rate, a checksum error rate, the attenuation of the signal by the transmission medium, a possible transmission bandwidth and temporal changes of the mentioned possible diagnosis variables. The speed of change of certain diagnosis variables allows to draw conclusions about an extraordinary aging of system components. In case of an optical transmission, the transmission medium effecting an attenuation is the respective optical fiber and in case of a radio transmission, it is the air.

For optical fibers which have a low-pass characteristic, the bandwidth corresponds to that modulation frequency at which the light power, compared to the value at the frequency zero, has optically fallen by 50% or, respectively, 3 dB.

For a central error monitoring, the evaluation unit can advantageously be arranged in a central device of the communication system. In a further preferred embodiment, the evaluation unit is arranged in the second diagnosis unit so that the statistical evaluation takes place directly in the diagnosis unit. Particularly advantageously, each of the diagnosis units used in the communication system can comprise an evaluation unit and can carry out a statistical evaluation of diagnosis data determined by each of the other diagnosis units, and depending thereon, can carry out a diagnosis of the diagnosis data determined by the diagnosis unit itself.

The method is particularly advantageously configured to detect predetermined error types which are typically not detected by a worst case analysis. For this purpose and for the diagnosis of a predetermined error type, preferably, for at least one diagnosis variable, a limit value is defined for the deviation from an average value of the respective diagnosis variable, wherein the average value is determined by the statistical evaluation.

An electronic component according to the invention is configured for carrying out the above described method and comprises a receiver unit for receiving values of at least one diagnosis variable of a plurality of communication connections of a communication system, a storage for storing the received values, and an evaluation unit for statistically evaluating all received values and for diagnosing the received values of at least one selected communication connection depending on the statistical evaluation.

A communication system according to the invention is configured for carrying out the above described method and comprises a plurality of communication connections, a plurality of diagnosis units which each are assigned to at least one communication connection and are configured to determine a value of at least one diagnosis variable of the respectively assigned communication connections, and at least one evaluation unit, wherein the diagnosis units are configured to transfer determined values of the at least one diagnosis variable to the at least one evaluation unit, and the evaluation unit is configured for statistically evaluating all received values and for diagnosing the received values of at least one selected communication connection depending on the statistical evaluation.

The electronic component and the communication system are further preferably configured for carrying out the above described advantageous and/or preferred configurations of the method according to the invention.

BRIEF DESCRIPTION OF THE DRAWINGS

The invention is described in more detail hereinafter by means of preferred embodiments and with reference to the accompanying drawings. Identical reference numbers in the drawings designate identical or similar parts.

In the figures.

DETAILED DESCRIPTION

Figure 1:
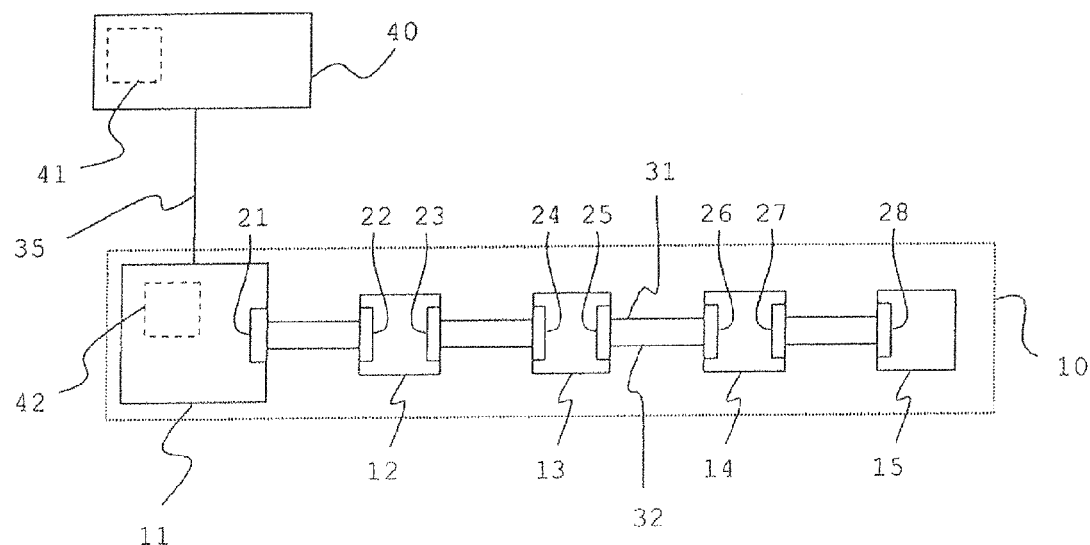
FIG. 1 shows schematically a preferred embodiment of a communication system according to the invention which is exemplary based on the Interbus standard.

FIG. 1 shows an exemplary communication system 10 which, for example, is configured as Interbus system which comprises a master 11 as bus subscriber, wherein the slaves 12, 13, 14 and 15 are connected to the master. In the illustrated example, adjacent bus subscribers are each connected to each other via optical duplex connections. Each optical duplex connection comprises two FO connection which, as an example for the connection between the bus subscribers 13 and 14, are designated with the reference numbers 31 and 32. In the bus subscribers, a plurality of diagnosis units 21 to 28 are arranged, wherein to each diagnosis unit at least one FO connection is assigned, and wherein the diagnosis units each are configured to monitor at least one predetermined diagnosis variable such as, for example, the transmitting or receiving power or the bandwidth of an assigned FO connection and to transfer corresponding diagnosis data to an evaluation unit.

An evaluation unit 42 which receives the diagnosis data from the diagnosis units 21 to 28 and evaluates said data statistically can preferably be arranged in the master 11. Alternatively or additionally, an evaluation unit 41 can also be arranged in a central device 40 of a communication system superimposing the communication system 10, wherein the central device receives the diagnosis data of the diagnosis units 21 to 28 via a connection 35 to the master 11, wherein for the sake of simplicity, the data connection 35 is illustrated as direct communication connection. The master 11 can also be connected to the central device 40 via a non-illustrated superimposed communication network.

In a further preferred embodiment, one, a plurality or all of the diagnosis units 21 to 28 arranged in the communication system 10 can receive the diagnosis data of each of the other diagnosis units and can comprise an evaluation unit for the statistical evaluation of the diagnosis data.

The evaluation unit 41, 42 or an evaluation unit arranged in a diagnosis unit evaluates the received diagnosis data statistically and performs a diagnosis of the values determined by at least one of the diagnosis units 21 to 28 depending on a results of the statistical evaluation. As result of the statistical evaluation, preferably, at least one limit value or one average value for at least one diagnosis variable is determined, wherein the diagnosis data of a selected diagnosis unit are compared with said value.

Particularly advantageous, the statistical evaluation and diagnosis of the diagnosis data takes place repeatedly in predetermined time intervals so that a dynamic error monitoring is achieved which adapts automatically to configuration changes of the communication system 10.

The invention thus provides a "self-learning" statistical evaluation of diagnosis data which makes a significant contribution to a better error detection. This is described hereinafter by means of two examples.

In the first example, the diagnosis data of a FO duplex connection, for example, comprising the FO connections 31 and 32, are still within the worst case limit values, wherein the monitored diagnosis variables comprise, for example, a regulating stage and a bandwidth of the FO connections 31 and 32. However, the statistical evaluation shows a significant difference in the regulating stages between the two FO connections 31 and 32, wherein the regulating stage of the one lead, for example the FO connection 31, lies above the typical value which was independently determined by the diagnosis software of the evaluation unit from the diagnosis data of all diagnosis units stored in a data base, wherein a higher regulating stage is equivalent to a higher attenuation. The performed bandwidth diagnosis provides a significantly smaller bandwidth for the path 31 with the increased attenuation than for the other path 32 of the duplex line. This error pattern indicates a high probability of a poorly assembled connector at the duplex line. Advantageously, for the automatic error detection, a corresponding error profile for this error pattern is stored in the evaluation unit. An evaluation only on the basis of worst case limit values would not lead to an error detection in the illustrated example.

In the second example, the diagnosis data of a FO duplex connection, for example comprising the FO connections 31 and 32, are again still within the worst case limit values, wherein the monitored diagnosis variables comprise again, for example, a regulating stage and a bandwidth of the FO connections 31 and 32. In this example, the statistical evaluation shows that the attenuation of the path for the two leads 31 and 32 is higher than the typical value determined from the stored diagnosis data, while the bandwidth is in each case significantly better than the correspondingly determined typical value. This error pattern indicates a FO cable laying with bending radii which are too narrow because the latter result in an attenuation increase and an improvement of the possible transmission bandwidth. In this example too, an evaluation on the basis of worst case limit values would not have led to an error detection.

For the error patterns described above and other known error patterns, preferably, corresponding error profiles are stored so that a software running, for example, in an evaluation unit provides not only the statistical analysis and the calculation of typical limit values, but also the check for known error patterns and provides adequate information and proposals for a solution. Such a diagnosis software can advantageously run on a device such as the master 11 which administrates also the communication system 10 and thus has access to all path data. In this case, the diagnosis software is stored, for example, in the evaluation unit 42. Alternatively, the diagnosis software can also run on a central superimposed system. In this case, the diagnosis software is stored, for example, in the evaluation unit 41.

The communication system 10 illustrated in FIG. 1 is configured as Interbus system and is only exemplary. However, the invention is not limited to Interbus systems but can be used in any other suitable communication system such as, for example, a communication system based on Ethernet or Bluetooth.

Figure 2:
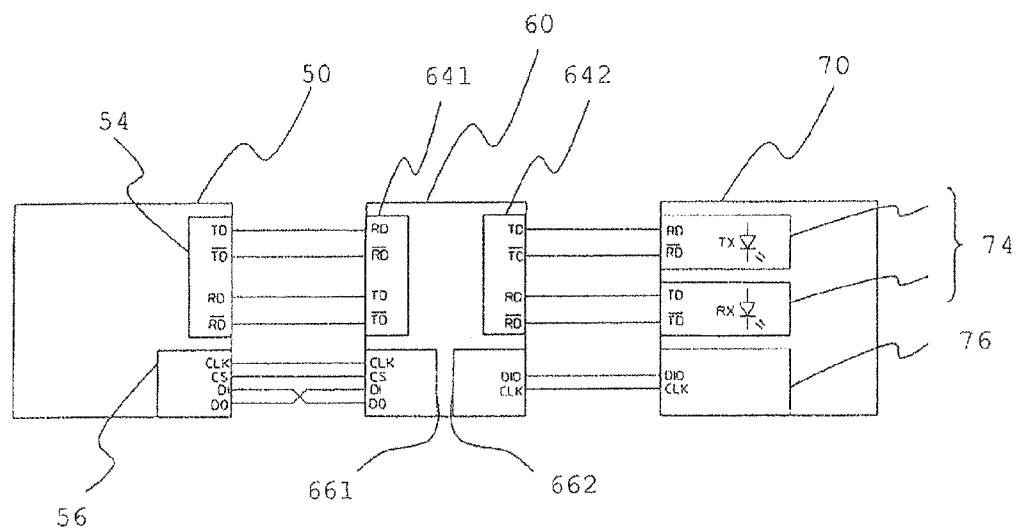
FIG. 2 shows a schematic illustration of an exemplary embodiment of a diagnosis unit.

FIG. 2 illustrates exemplary a diagnosis unit 60 configured for the use in an optical communication system based on Ethernet. In the illustrated exemplary embodiment, the diagnosis unit 60 is configured as diagnosis chip which is connected in the data path between a PHY transceiver 50 assigned to the physical layer of a network and an optical FO transceiver 70. For data communication, first and second interfaces 641 and 642 are provided in component 60 via which interfaces the PECL interface 74 of the FO transceiver 70 is connected to the PECL interface 54 of the PHY transceiver 50. Thereby, in the case of the normal Ethernet communication, the component 60 configured as separate diagnosis chip is transparent for the Ethernet data signals.

The component 60 comprises further, in particular for querying the received light power, a first serial interface 62 for connection to a DMI interface 76 of the optical transceiver 70. Moreover, a second serial interface 661 for connection to a serial interface 56 of the PHY transceiver 50 is provided.

In this exemplary embodiment, the interfaces 76 and 662 use the I²C transmission protocol and the interfaces 56 and 661 use the SPI transmission protocol. For conversion between these two transmission protocols, an adequate, non-illustrated converter is integrated in component 60.

The diagnosis unit 60 exemplary illustrated in FIG. 2 is advantageously configured for determining an attenuation and a bandwidth of an optical fiber. For the invention it is advantageously also possible to use diagnosis units which, for determining diagnosis data, use an interface according to SFF-8472, revision 9.3 (Digital Diagnostic Monitoring Interface for Optical Transceivers).

What is claimed is:

1. A method for diagnosis of communication connections in a communication system, comprising:
   a) providing a plurality of first diagnosis units and at least one second diagnosis unit, wherein the first and second diagnosis units are each assigned to at least one communication connection of the communication system and are configured to determine a value of at least one diagnosis variable of the respectively assigned communication connections;
   b) determining a value of the at least one diagnosis variable by each of the first diagnosis units;
   c) determining a value of the at least one diagnosis variable by the at least one second diagnosis unit;

d) transferring the values determined by each of the first diagnosis units to an evaluation unit;

e) statistically evaluating the transferred values by the evaluation unit, wherein the evaluating by the evaluation unit comprises determining at least one of an upper limit value and a lower limit value for the at least one diagnosis variable; and f) diagnosing, for error detection, the values determined by the at least one second diagnosis unit depending on the statistical evaluation by the evaluation unit, wherein the diagnosing comprises comparing the value determined by the at least one second diagnosis unit with the at least one of the upper limit value and the lower limit value, wherein as upper limit value for the at least one diagnosis variable, a value is determined below which value a predetermined proportion of the values of the respective diagnosis variable determined by the first diagnosis units lies, or wherein as lower limit value for the at least one diagnosis variable, a value is determined above which value a predetermined proportion of the values of the respective diagnosis variable determined by the first diagnosis units lies.

2. The method according to claim 1, wherein the steps b) to f) are repeated in predetermined time intervals and/or in case of a change of the configuration of the communication system.

3. The method according to claim 1, wherein the predetermined proportion lies below 100%.

4. The method according to claim 1, wherein statistically evaluating by the evaluation unit comprises determining an average value of at least one diagnosis variable.

5. The method according to claim 1, wherein the at least one diagnosis variable comprises at least one variable or a temporal change of a variable, wherein the variable is selected from a group comprising the variables:
(i) transmitting power,
(ii) receiving power,
(iii) path length of the respective communication connection,
(iv) bit error rate,
(v) checksum error rate,
(vi) attenuation, and
(vii) transmission bandwidth.

6. The method according to claim 1, wherein for at least one duplex communication connection having a first and a second data direction, a first value for the first data direction and a second value for the second data direction of the at least one diagnosis variable is determined, and wherein the diagnosis comprises comparing the first and second value to each other and/or to an upper and/or lower limit value and/or average value determined by the statistical evaluation.

7. The method according to claim 1, wherein the second diagnosis unit or a central device of the communication system or a superimposed communication system comprises the evaluation unit.

8. The method according to claim 1, wherein for detecting a predetermined error type for the at least one diagnosis variable, a limit value for a deviation from an average value of the respective diagnosis variable determined by the statistical evaluation is defined.

9. The method according to claim 1, wherein the communication connections are configured as wireless or optical connections.

10. An electronic component, configured for carrying out a method according to claim 1, comprising:
a receiver unit for receiving values of at least one diagnosis variable of a plurality of communication connections of a communication system;
a storage for storing the received values; and
an evaluation unit for statistically evaluating all received values and for diagnosing, for error detection, the received values of at least one selected communication connection depending on the statistical evaluation, wherein statistically evaluating by the evaluation unit comprises determining at least one of an upper limit value and a lower limit value for the at least one diagnosis variable, and diagnosing comprises comparing the received values of the at least one selected communication connection with the at least one of the upper limit value and the lower limit value, wherein as upper limit value for the at least one diagnosis variable, a value is determined below which value a predetermined proportion of the values of the respective diagnosis variable determined by the first diagnosis units lies, or wherein as lower limit value for the at least one diagnosis variable, a value is determined above which value a predetermined proportion of the values of the respective diagnosis variable determined by the first diagnosis units lies.

11. A communication system, configured for carrying out a method according to claim 1, comprising:
a plurality of communication connections;
a plurality of diagnosis units that are each assigned to at least one of the communication connections and are configured to determine a value of at least one diagnosis variable of the respectively assigned communication connections; and
at least one evaluation unit, wherein the diagnosis units are configured to transfer determined values of the at least one diagnosis variable to the at least one evaluation unit, wherein the evaluation unit is configured to statistically evaluate all received values and for diagnosing, for error detection, the received values of at least one selected communication connection depending on the statistical evaluation, wherein statistically evaluating by the evaluation unit comprises determining at least one of an upper limit value and a lower limit value for the at least one diagnosis variable, and diagnosing comprises comparing the received values of the at least one selected communication connection with the at least one of the upper limit value and the lower limit value, wherein as upper limit value for the at least one diagnosis variable, a value is determined below which value a predetermined proportion of the values of the respective diagnosis variable determined by the first diagnosis units lies, or wherein as lower limit value for the at least one diagnosis variable, a value is determined above which value a predetermined proportion of the values of the respective diagnosis variable determined by the first diagnosis units lies.

12. The method according to claim 1, wherein the predetermined proportion lies below 95%.

13. The method according to claim 1, wherein the predetermined proportion lies below 90%.

14. The method according to claim 1, wherein the predetermined proportion lies below 85%.

15. The method according to claim 1, wherein the predetermined proportion lies below 80%.

* * * * *